Jan. 19, 1937.    C. C. ROSE    2,068,434
METHOD OF TREATING FRESHLY PASTED STORAGE BATTERY PLATES
Filed April 17, 1936
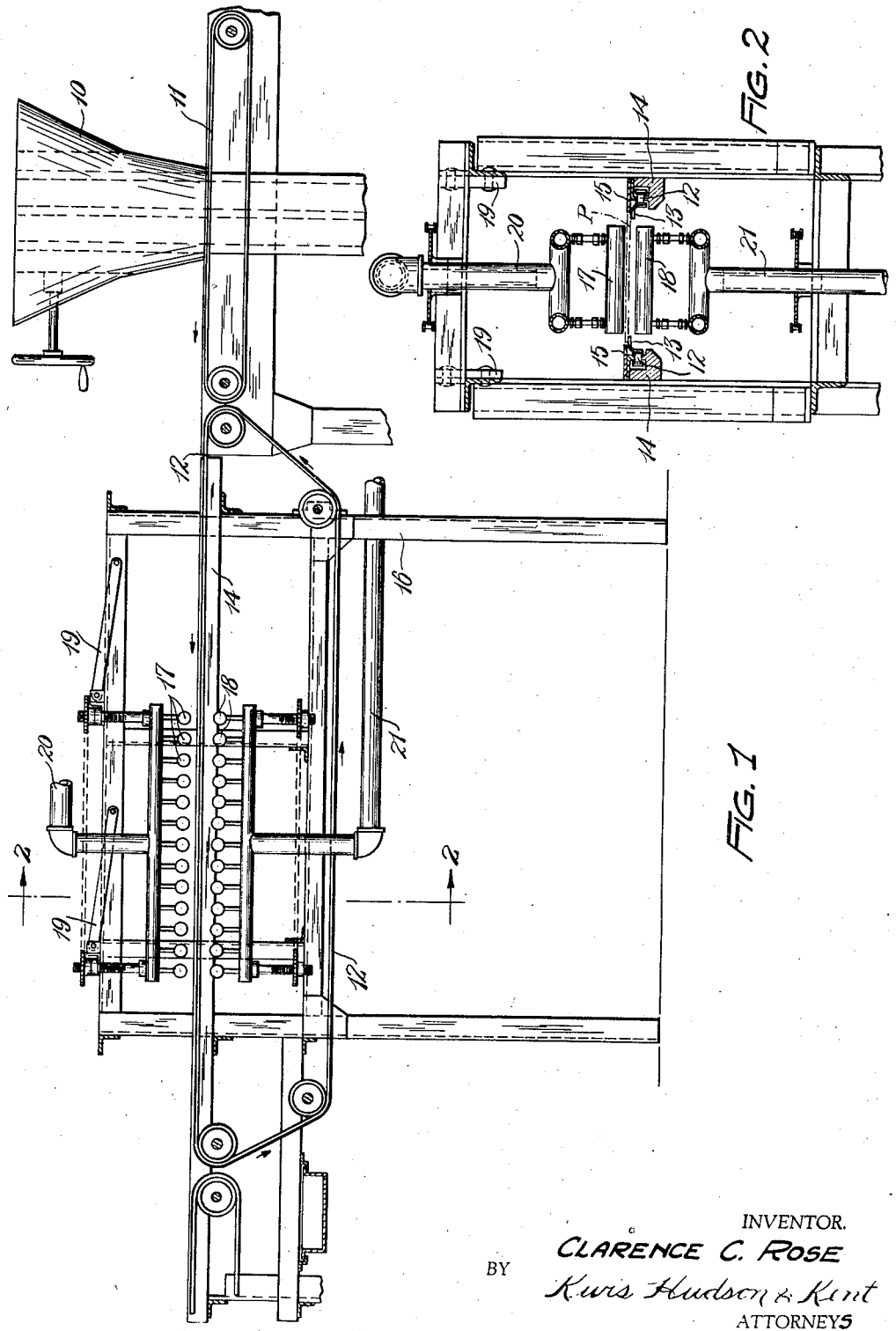
INVENTOR.
CLARENCE C. ROSE
BY
Kwis Hudson & Kent
ATTORNEYS Patented Jan. 19, 1937

2,068,434

UNITED STATES PATENT OFFICE 2,068,434

METHOD OF TREATING FRESHLY PASTED STORAGE BATTERY PLATES

Clarence C. Rose, Mentor, Ohio, assignor to Willard Storage Battery Company, Cleveland, Ohio, a corporation of West Virginia Application April 17, 1936, Serial No. 75,027

13 Claims. (Cl. 136—78)

This invention relates to a method of treating freshly pasted storage battery plates, and has reference particularly to the treatment of plates for lead-acid batteries in such manner as to make possible the stacking of the plates after pasting without having them stick to each other.

In the present prevailing methods for handling storage battery plates of this type between the operations of pasting and charging, the plates after being pasted must be handled individually, that is placed in racks so that their surfaces are separated, and then maintained for some hours in an atmosphere of controlled temperature and humidity. Then while so racked they are put through drying ovens in order that the moisture present in the paste may be expelled. Thereafter they must be wetted again and then stacked and kept in storage under proper conditions to give satisfactory battery capacity and life characteristics.

One of the objects of the present invention is the elimination of some of these steps by so treating plates immediately after they are pasted, and without handling them at all, that they may be piled in stacks one upon another without danger of sticking together, whereby the storing and aging process may be entered into at once without the usual setting and drying steps which were necessary in the prior procedure. Rewetting is also not required.

Other objects and features of novelty will appear as I proceed with the description of the method and that form of apparatus which is illustrated in the accompanying drawing, in which Fig. 1 is an elevational side view, somewhat fragmentary and diagrammatic in character, illustrating an apparatus which may be employed in carrying out the invention.

Fig. 2 is a vertical cross sectional view taken substantially on the line 2—2 of Fig. 1.

In the drawing 10 is a paste hopper with its open bottom end arranged in close proximity to the upper surface of an endless belt 11, or other means for conveying grids up to the paster and for conveying the pasted plates away from the paster. The pasted plates, as they leave the conveyor 11, are delivered onto a conveyor of special construction comprising a pair of spaced endless chains 12 which at frequent intervals carry fingers 13 projecting inwardly toward each other, to an extent sufficient to support the edges of the plates, one of which is indicated in dotted lines at P, Fig. 2. In this manner practically the entire upper and lower surfaces of the plates are left exposed and unobstructed. The upper runs of the chains 12 are supported and guided in rails 14. To the tops of these rails I attach guard or guide strips 15, which maintain the plates in alignment as they are carried along by the chains.

The chains 12 and the rails 14 are supported in a frame 16 of suitable character which also carries upper and lower sets of gas or other fluid burners 17 and 18. These burners extend transversely substantially across the width of the plate, and are spaced far enough away from the plate to cause the tips of the flames from the burners to impinge upon the upper and lower surfaces of the plate. The number of these burners may be varied to suit conditions. Obviously the speed of travel of the chains 12 is an important factor in determining the number of burners required for a given result.

The upper burners are conveniently mounted as a unit, which is capable of being swung up in a parallelogram movement by means of links 19, thereby providing access to the conveyor at that point. The lower set of burners is likewise conveniently mounted as a unit, and may be mounted similarly to the upper set if desired, but as herein illustrated this unit is supported rigidly in the frame. In both cases there is preferably provision for adjustment so that the distance of the burners from the plates may be varied to a small extent.

Gas mixed with air is supplied to the burners through pipes 20 and 21. The gas is fuel gas, preferably natural gas. The proportion of air is very carefully maintained at a level such that the products of combustion shall be carbon dioxide primarily. Any carbon monoxide which may be present is in such small quantities as to be negligible. Hence the plates are subjected progressively on both pasted surfaces to evenly distributed streams of carbon dioxide in the presence of heat.

When the plates have traversed the path between the two sets of burners their treatment is completed, except that they are preferably given time to cool, which procedure promotes some further evaporation of moisture. They may then be lifted off the carrier by an attendant and stacked in piles, or collected in a suitable automatically acting take-off apparatus.

While I use the blue tip or oxidizing portion of the flame, I do so because that portion is the hottest and not because of its oxidizing effect. However, it is important not to use a reducing flame, because that would be detrimental in that it would reduce the lead oxide of the paste to metallic lead, which would form in globules under the effect of the heat.

The carbon dioxide combines with the lead oxide of the paste to form lead carbonate, at least upon the surfaces of the plate. This compound functions in some manner to prevent the heat from the flames cracking the paste, that is if the heat is not too great or maintained too long on a given area. The application of heat in accordance with the invention is a somewhat critical treatment, that is to say if it is not continued long enough the plates will stick together when stacked in piles, and if it is continued too long cracking of the paste will occur. I have found by tests that the heat thus applied should be sufficient to reduce the moisture content of the paste to the extent that water shall constitute from 9% to 11% of the total weight of the paste. This compares with a proportion of 12½% to 13% of water to the total before the plate is subjected to the flames.

Since the flames are close to the plate, the spacing of the burners from the plates being only a fraction of an inch, the carbon dioxide formed in the flames impinges directly on the surfaces of the plate without becoming mixed with air, and furthermore the flame concentrates heat at the same point, which assists in the chemical action as well as promoting the partial or surface drying of the paste.

I cannot state the exact reason for the action of the lead carbonate formation on the paste in preventing cracking thereof when the stated amount of moisture is quickly expelled from the paste. I do know however that, by the use of a gas flame containing carbon dioxide as the principal product of combustion, a freshly pasted battery plate can tolerate rapid drying to the extent that the plates may be practically and economically handled mechanically and compactly stacked in piles and placed in storage for subsequent processing.

Having thus described my invention, I claim:

1. The method of drying freshly pasted plates for storage batteries of the lead-acid type, which comprises playing directly upon pasted portions of the plates a flame containing carbon dioxide.

2. The method of treating freshly pasted plates for storage batteries of the lead-acid type, which comprises playing directly upon the pasted portions of the plates on each side thereof flames containing carbon dioxide.

3. The method of treating freshly pasted plates for storage batteries of the lead-acid type, which comprises subjecting all pasted portions of the plates on each side thereof for a brief period to the direct action of a flame containing carbon dioxide.

4. The method of treating freshly pasted plates for storage batteries of the lead-acid type, which comprises subjecting all pasted portions of the plates on each side thereof to the direct action of a flame containing carbon dioxide for a period long enough to reduce the weight of moisture in the paste to approximately 10% of the total paste weight.

5. The method of treating freshly pasted plates for storage batteries of the lead-acid type, which comprises subjecting all pasted portions of the plates on each side thereof to the direct action of a flame containing carbon dioxide for a period long enough to reduce the weight of moisture in the paste as compared with the total paste weight to an amount between 9% and 11%.

6. The method of treating freshly pasted plates for storage batteries of the lead-acid type, which comprises conveying the plates between opposed flames containing carbon dioxide playing directly upon all pasted surfaces of the plates in lines extending transversely thereof.

7. The method of treating freshly pasted plates for storage batteries of the lead-acid type, which comprises subjecting all pasted portions of the plates successively on each side thereof to the direct action of flames containing carbon dioxide.

8. The method of treating freshly pasted plates for storage batteries of the lead-acid type, which comprises conveying the plates flatwise between a pair of transversely arranged lines of flames containing carbon dioxide and playing directly upon the pasted surfaces.

9. The method of treating freshly pasted plates for storage batteries of the lead-acid type, which comprises subjecting successively all pasted surface areas of the plate to the action of carbon dioxide accompanied by a flame applied directly to the same areas simultaneously with the carbon dioxide.

10. The method of treating freshly pasted plates for storage batteries of the lead-acid type, which comprises playing upon the surface of the plate the flame from an ignited mixture of fuel gas and air, and thereby causing carbon dioxide produced by the combustion in the flame to react with the lead oxides of the paste to form a coating of lead carbonate.

11. The method of treating freshly pasted plates for storage batteries of the lead-acid type, which comprises playing upon the surface of the plate the flame from an ignited mixture of fuel gas and air, thereby causing carbon dioxide produced by the combustion in the flame to react with the lead oxides of the paste to form a coating of lead carbonate, and at the same time drying the paste at and near the surface of the plate.

12. The method of treating freshly pasted plates for storage batteries of the lead-acid type, which comprises playing upon the surface of the plate a flame produced by mixing with a fluid fuel sufficient air to form carbon dioxide as the principal product of combustion in the flame, thereby causing the carbon dioxide of the flame to react with the lead oxides of the paste at the surface of the plate to form a coating of lead carbonate.

13. The method of treating freshly pasted plates for storage batteries of the lead-acid type, which comprises playing upon the surface of the plate a flame produced by mixing with a fluid fuel sufficient air to form carbon dioxide as the principal product of combustion in the flame, thereby causing the carbon dioxide of the flame to react with the lead oxides of the paste at the surface of the plate to form a coating of lead carbonate, the heat from the flame facilitating the said reaction and serving further to dry the paste at least at the surface of the plate.

CLARENCE C. ROSE.